3,706,833
USE OF 4,6-DIAMINOPYRIMIDINE HYDROCHLORIDE AS AN ANTIFUNGAL AGENT
Mary Eloise McCoy, Pearl River, and Gunnar Sigurd Redin, New City, N.Y., assignors to American Cyanamid Company, Stamford, Conn.
No Drawing. Filed Apr. 13, 1971, Ser. No. 133,708
Int. Cl. A61k 27/00
U.S. Cl. 424—251                    4 Claims

ABSTRACT OF THE DISCLOSURE

The method for the use of 4,6-diaminopyrimidine and salts thereof as antifungal agents in warm blooded animals and compositions containing said compound is described.

SUMMARY OF THE INVENTION

This invention relates to the use of 4,6-diaminopyrimidine and salts thereof in warm blooded animals as an antifungal agent, preferably in treating *Cryptococcus neoformans*.

Of the numerous systemic mycoses, cryptococcsis is considered one of the most serious. Itsetiologic agent, *Cryptococcus neoformans*, has a tendency to invade the central nervous system of the body causing meningitis. Diagnosis of the disease makes for added further problems since the symptoms resemble tuberculosis, neoplasms, brain tumors and insanity. The resemblance of this disease to other maladies makes it difficult to determine its prevalence; however, it has been established that this disease exists on a worldwide basis.

In view of the severity of this infection, the pharmaceutical industry has been seeking agents that demonstrate activity against *Cryptococcus neoformans*, the causative agent. It has now been found that 4,6-diaminopyrimidine and salts thereof, preferably the dihydrochloride, demonstrate in vivo antifungal activity against *Cryptococcus neoformans*. 4,6-diaminopyrimidine, a known compound, is readily prepared by the method of G. W. Kenner, et al. (Journal of the Chemical Society, 1943, p. 574).

The compound may be employed as the free base, mono- or di-acid addition salt thereof or hydrate of one of the aforementioned compounds. In forming the salts, acids used must be such that a sufficiently stable therapeutically acceptable salt is obtained. Typical, although certainly not the only acids that may be employed are sulfuric, phosphoric, hydrochloric, citric, acetic, or tartaric which, depending upon the concentration employed, yield the corresponding mono- or di-sulfate, phosphate, hydrochloride, citrate, acetate or tartrate salt of 4,6-diaminopyrimidine. Where hydroscopic compounds are formed, a stable hydrate may be employed. While the compound is effective in mice at 160 mg./kg. and above, generally lower doses are required in higher animals. Thus the compound may be administered to warm-blooded animals orally, rectally or parenterally at a dose range of 40 mg. to 210 mg./kg. of body weight, preferably 60 mg. to 210 mg./kg. of body weight. Thus the average daily dosage for a 70 kg. body weight subject would total about 3 to about 15 g. and preferably about 4.2 g. to about 15 g.

The oral administration of the active compounds may be achieved either with an inert diluent, or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the comopsitions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 50 and 500 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as mangesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as pieservatives, a dye and a flavoring such as cherry or orange flavor. Of course, any material used in preparing any dosage unit form should be pharmaceutically pure and substantially non-toxic in the amounts employed.

Rectal administration of the active compounds may be achieved by dispersing the active ingredient in a pharmaceutically acceptable material that at body temperature liquefies and releases the active ingredient.

Compositions according to the present invention having the desired clarity, stability, and adaptability for parenteral use are obtained by dissolving from 0.10% to 10.0% by weight of active compound in a vehicle consisting of a polyhydric aliphatic alcohol or mixtures thereof. Especially satisfactory are glycerin, propylene glycol, and the polyethylene glycols. The polyethylene glycols consist of a mixture of non-volatile, normally liquid, polyethylene glycols which are soluble in both water and organic liquids and which have molecular weights of from about 200 to about 1500. Although the amount of active compounds dissolved in the above vehicle may vary from 0.10% to 10.0% by weight, it is preferred that the amount of active compound employed be from about 3.0% to about 9.0% by weight. Although various mixtures of the aforementioned non-volatile polyethylene glycols may be employed, it is preferred to use a mixture having an average molecular weight of from about 200 to about 400.

In addition to the active compounds, the parenteral solutions of the present invention may also contain various preservatives which may be used to prevent bacterial and fungal contamination. The preservatives which may be used for such purpose are, for example, benzyl alcohol, myristyl-gamma-picolinium chloride, phenyl mercuric nitrate, benzalkonium chloride, phenethyl alcohol, p-chlorophenyl-α-glycerol ether, methyl and propyl parabens, and thimerosal. As a practical matter it is also convenient to employ antioxidants. Suitable antioxidants include, for example, sodium bisulfite, sodium metabisulfite, and sodium formaldehyde sulfoxylate. Generally, from about 0.05% to about 0.2% concentrations of antioxidant are employed.

The compounds described in this invention demonstrate in vivo antifungal activity. 4,6-diaminopyrimidine dihydrochloride was incorporated in a standard diet for mice. The basic standard diet is composed of the following ingredients: animal liver meal, fish meal, dried whole whey, corn and wheat flakes, ground yellow corn, ground oats, dehulled soybean meal, wheat germ meal, wheat middlings, cane molasses, dehydrated alfalfa meal, soybean oil, brewers dried yeast, irradiated dried yeast (source of Vitamin D2), riboflavin, niacin, calcium pantothenate, choline chloride, vitamin A palmitate, d-activated animal sterol, α-tocopherol, dicalcium phosphate, salt and traces of: manganese sulfate, copper sulfate, iron carbonate, potassium iodate, cobalt sulfate and zinc oxide. This commercial feed has a guaranteed analysis of a minimum of 24.0% crude protein, a minimum of 4.0% crude fat and a maximum of 4.5% crude fiber and is sold under the trademark Wayne Lab-Blox by Allied Mills, Inc., Chicago, Ill. The standard diet with the active compound together with water ad libitum was made available to infected Carworth Farms CF 1-S white female mice weighing 18–22 g. each from 1 day before introduction of the infectious material until 6 days following. The lethal systemic *Cryptococcus neoformans* infection was produced by intravenous injection of 0.2 ml. of a 1:10 tryptase soy broth dilution from a 72 hour culture grown in trypticase soy broth on a rotary shaker at 30° C.

The drug intake was determined by the method described in Chemotherapia 4: 386–397 (1962). Thus calculations were based on the initial average weight of the mice, the total diet consumed during the treatment period and the concentration of the drug in the diet.

Control animals received untreated standard diet for the entire test period.

The results appear in Table I.

Table I

| Percent of drug in diet (mg./kg. of body wt./day): | Alive/total mice 14 days after infection |
|---|---|
| 0.4 | 39/40 |
| 0.2 | 30/39 |
| 0.1 | 7/40 |
| 0.05 | 1/40 |
| 0.025 | 3/30 |
| Infected, nontreated controls | 0/100 |
| Noninfected, nontreated controls | 40/40 |

SPECIFIC DISCLOSURE OF THE INVENTION

The invention will be further illustrated in conjunction with the following examples which are to be taken as illustrative only and not by way of limitation.

EXAMPLE 1

Preparation of capsule formulation

| | Grams |
|---|---|
| 4,6-diaminopyrimidine hydrochloride | 20 |
| Magnesium stearate | 0.125 |

The above ingredients are thoroughly mixed and dispensed as 50 capsules. Each capsule contains 0.4 grams of active component.

EXAMPLE 2

Preparation of tablet formulation

| | Grams |
|---|---|
| 4,6-diaminopyrimidine hydrochloride | 100.0 |
| Cornstarch | 4.0 |
| Methylcellulose (400 cps.) | 1.0 |
| Magnesium stearate (1%) | 1.050 |

The above ingredients are thoroughly mixed and compressed into 100 tablets. Each tablet contains 1 gram of active component.

We claim:

1. A method for the control of fungus infections in warm-blooded animals which comprises: administering to said warm-blooded animals suffering from a fungus infection an antifungal effective amount of a compound selected from the group consisting essentially of 4,6-diaminopyrimidine and therapeutically acceptable salts of 4,6-diaminopyrimidine.

2. A method according to claim 1 wherein said therapeutically acceptable salt is 4,6-diaminopyrimidine dihydrochloride.

3. A method according to claim 2 wherein said fungus infection is caused by *Cryptococcus neoformans*.

4. A method according to claim 3 wherein said compound is administered as a single dose of from 40 mg. to 210 mg. per kg. of animal body weight per day.

References Cited

Cancer Research, vol. 24, No. 2, Part 2, February 1964, pp. 211–218, 227 and 251 (No. 48646).

JEROME D. GOLDBERG, Primary Examiner